(12) United States Patent  
Costes

(10) Patent No.: US 8,140,212 B2  
(45) Date of Patent: Mar. 20, 2012

(54) METHOD FOR LOCATING THE LONGITUDINAL POSITION OF WHEELS OF A VEHICLE

(75) Inventor: Olivier Costes, Tournefeuille (FR)

(73) Assignee: Continental Automotive France, Toulouse (FR)

( * ) Notice: Subject to any disclaimer, the term of this patent is extended or adjusted under 35 U.S.C. 154(b) by 601 days.

(21) Appl. No.: 12/330,656

(22) Filed: Dec. 9, 2008

(65) Prior Publication Data

US 2009/0157250 A1     Jun. 18, 2009

(30) Foreign Application Priority Data

Dec. 14, 2007   (FR) ...................................... 07 08705

(51) Int. Cl.
*G01M 17/00*     (2006.01)
(52) U.S. Cl. .......................................................... 701/29
(58) Field of Classification Search ............... 701/29, 701/32
See application file for complete search history.

(56) References Cited

U.S. PATENT DOCUMENTS

| | | | |
|---|---|---|---|
| 6,204,758 B1 | 3/2001 | Wacker et al. | |
| 7,415,334 B2* | 8/2008 | Lefaure | ........................... 701/29 |
| 2003/0233872 A1 | 12/2003 | Boulot | |
| 2006/0001533 A1 | 1/2006 | Bessho et al. | |
| 2009/0204286 A1* | 8/2009 | Costes | ........................... 701/29 |

FOREIGN PATENT DOCUMENTS

WO         02/34553         5/2002

OTHER PUBLICATIONS

French Search Report dated Jul. 17, 2008, from corresponding French application.

* cited by examiner

*Primary Examiner* — Eric Culbreth  
(74) *Attorney, Agent, or Firm* — Young & Thompson

(57) ABSTRACT

A method for locating the longitudinal position, on the front end or rear end of a vehicle with engine, of wheels fitted with an electronic module. Each electronic module incorporates elements for measuring vibrations stressing the corresponding wheel and resulting from rotation of the engine. First, a spectral analysis is performed in a preliminary phase, with the engine running, of signals delivered by the respective measurement elements of wheels mounted on the front end and the rear end, to establish a criterion for differentiating the signals by a frequency offset between these signals. Locating the longitudinal position of the wheels includes carrying out a spectral analysis of the signals delivered by the different measurement elements, with the engine running, and deducing from the frequency offset between the signals an indication of the longitudinal position of each wheel.

20 Claims, 2 Drawing Sheets

METHOD FOR LOCATING THE LONGITUDINAL POSITION OF WHEELS OF A VEHICLE

BACKGROUND OF THE INVENTION

1. Field of the Invention

Figure 1A:
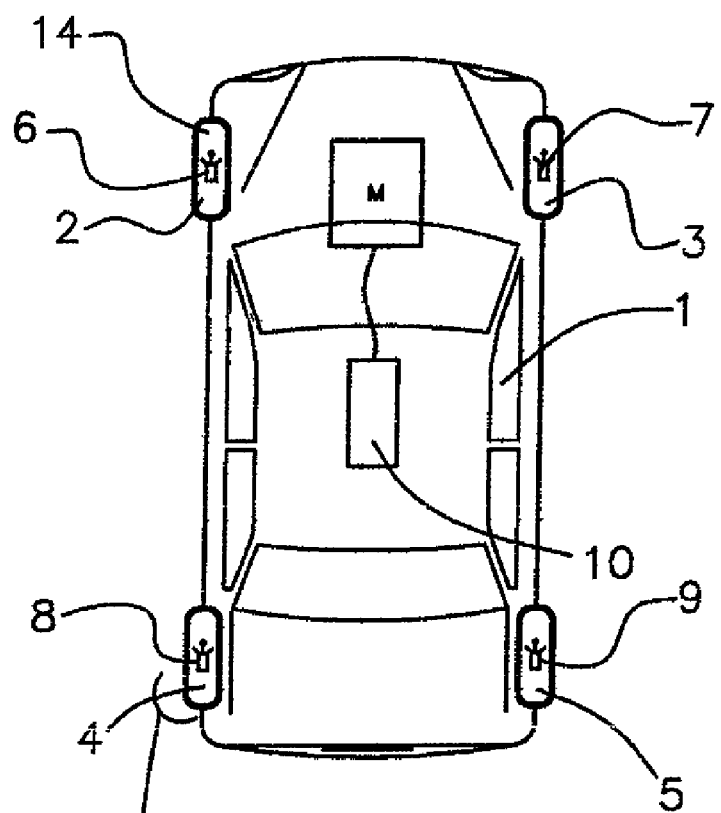

The invention relates to a method for locating the longitudinal position, either on the front end or on the rear end of a vehicle with an engine, of wheels fitted with an electronic module adapted to send, to a central processing unit mounted on the vehicle, signals representative of operating parameters of each wheel also comprising an identification code of the latter.

2. Description of the Related Art

For safety purposes, motor vehicles are increasingly being fitted with monitoring systems comprising sensors mounted on each of the wheels of the vehicle, dedicated to measuring parameters, such as pressure or temperature of the tires fitted on these wheels, and intended to inform the driver of any abnormal variation of the measured parameter.

These monitoring systems are conventionally provided:
- with an electronic module mounted on each of the wheels of the vehicle, incorporating, in addition to the above-mentioned sensors, a microprocessor and a radiofrequency sender (or RF sender), and
- with a central processing unit, mounted on the vehicle, to receive the signals sent by the senders. This central processing unit comprises a computer incorporating a radiofrequency receiver (or RF receiver) connected to an antenna.

One of the problems that such monitoring systems have to resolve lies in the obligation to have to associate with each signal received by the receiver of the central processing unit, an indication concerning the location of the electronic module and therefore of the wheel originating this signal, this obligation lasting for the lifetime of the vehicle, that is, having to be observed even after wheel changes or more simply change of the positions of these wheels.

At the present time, a first locating method consists in incorporating an accelerometer in each electronic module, and in implementing a locating technique based on statistical methods consisting in comparing the accelerations of the different wheels to obtain an indication concerning the respective position of each of said wheels.

However, this locating method has proven inefficient because it requires a significant running time in order to produce a discrimination between the different wheels.

A second locating method consists in using three low-frequency antennas, each positioned close to one of the wheels of the vehicle, and in performing a locating procedure consisting in successively exciting each of these three antennas by sending a low-frequency magnetic field.

According to this procedure, the electronic module mounted on the wheel located close to the excited antenna sends, in response and addressed to the central processing unit, a low-frequency signal comprising an identification code of said module, such that the successive excitation of the three antennas results in the locating of the three electronic modules mounted on the wheels close to these antennas, and, by deduction, in the locating of the fourth module.

The main advantage of such a method lies in the fact that the locating procedure is very rapid and leads to an almost instantaneous locating after the vehicle has started up.

However, this solution is very costly because it means fitting the vehicle with three antennas, with all the respective limitations: connecting cables, control amplifiers, etc.

SUMMARY OF THE INVENTION

The present invention, however, targets a third method dedicated to locating the longitudinal position (front end or rear end) of the wheels of a vehicle, and its main objective is to provide a locating method that is very powerful in terms of responsiveness and reliability, the implementation of which generates an overall cost price significantly lower than that generated, for one and the same final result, by implementing the current two methods described hereinabove.

To this end, the invention targets a method for locating the longitudinal position, either on the front end or on the rear end of a vehicle with an engine, of wheels fitted with an electronic module adapted to send, to a central processing unit mounted on the vehicle, signals representative of operating parameters of each wheel also comprising an identification code of the latter. According to the invention, this locating method consists in incorporating, in each electronic module, means of measuring vibrations stressing the corresponding wheel and resulting from the rotation of the engine, and:
- in a preliminary phase of characterization of each vehicle type, in performing, with the engine running and for at least one speed of rotation of said engine, a spectral analysis of the signals representative of the vibrations according to the frequency delivered by the respective measurement means of a wheel mounted on the front end and a wheel mounted on the rear end, so as to establish a criterion for differentiating said signals consisting in a frequency offset between the latter,
- and in setting up a procedure for locating the longitudinal position of the wheels consisting in carrying out, with the engine running, an analysis of the signals representative of the amplitude variations of the vibrations according to the frequency, delivered, at at least one same instant t, by the different measurement means, and in deducing from the frequency offset between said signals, an indication concerning the longitudinal position of each wheel.

It should be noted that, according to the invention, the term "measurement means" is used generally to define any means, such as, for example, vibration sensors, acoustic sensors, designed to supply signals representative of amplitude versus frequency spectra, of the vibrations deriving from the rotation of the engine of the vehicle to which said measurement means are subjected to.

The invention therefore consisted:
- in implementing a locating technique based on the measurement, at the level of the electronic modules, of the vibrations generated by the rotation of the engine of a vehicle,
- in highlighting the fact that the signals delivered by measurement means positioned on one and the same end, front or rear, present substantially no differential offset,
- and in highlighting the fact that the signals delivered by measurement means positioned on different ends present a characteristic differential offset able to make it possible to determine the longitudinal location of the wheels.

Such a technique is very powerful in terms of responsiveness because it results in a locating of the longitudinal position of the wheels that is almost immediate after starting up the engine.

According to an advantageous implementation, measurement means are used that consist of vibration sensors able to deliver signals representative of the "solid-borne" vibrations stressing the wheels.

Such vibration sensors consist of sensors based on a simple and proven technology and lead, for one and the same final result, to an overall installation cost (supply, installation and software adaptation) lower than that of an installation comprising accelerometers.

Another advantage of these vibration sensors lies in their robustness which is particularly suited to the severe environmental conditions of the electronic modules.

BRIEF DESCRIPTION OF THE DRAWING FIGURES

Figure 1B:
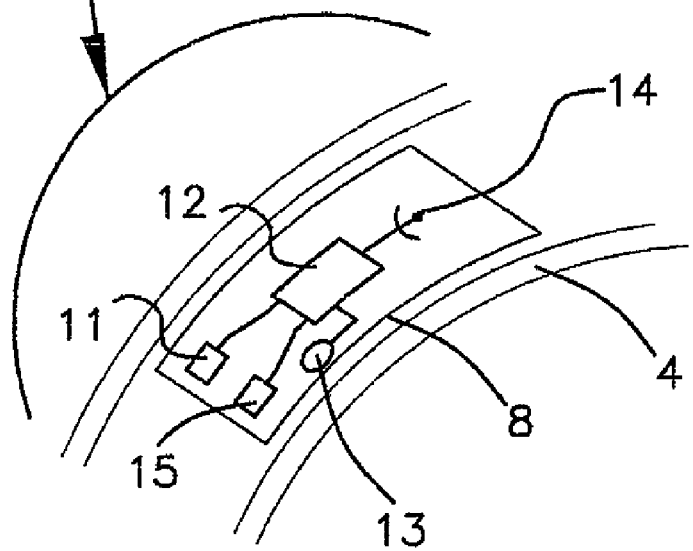
Figure 2:
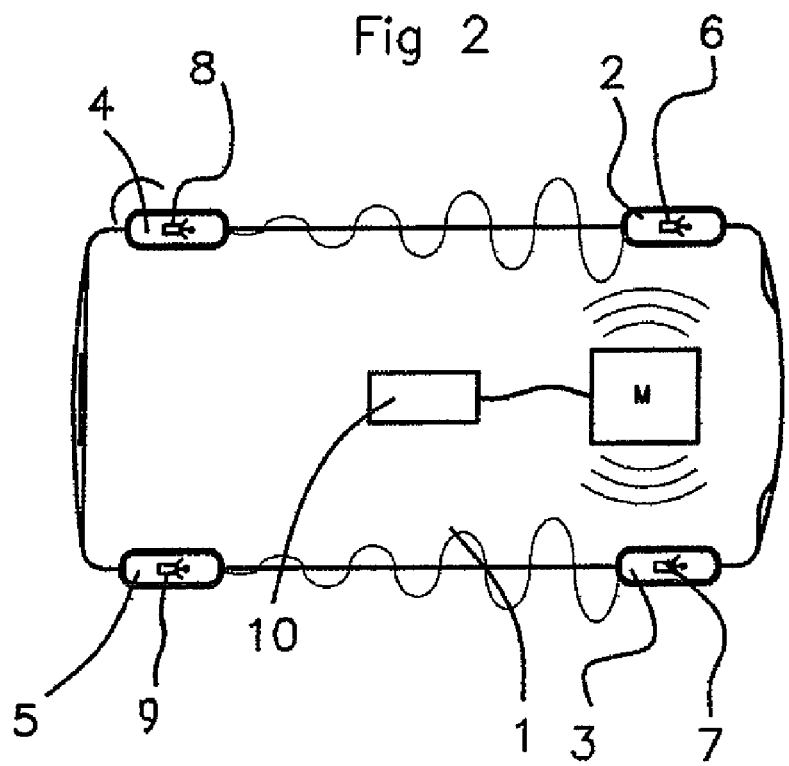
Figure 3:
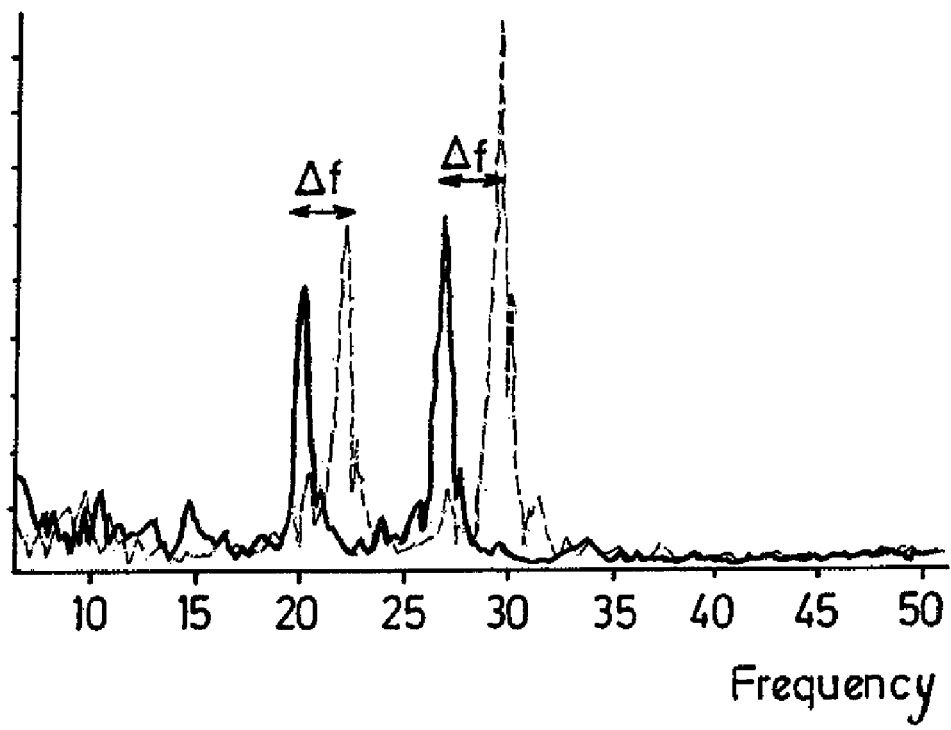

Other characteristics, aims and advantages of the invention will become apparent from the detailed description that follows, with reference to the appended drawings which represent, by way of nonlimiting example, a preferred embodiment thereof. In these drawings:

FIG. 1a is a diagrammatic top view of a vehicle provided with a monitoring system associated with a device according to the invention for locating the longitudinal position of the wheels of said vehicle, FIG. 1b is a diagrammatic detail view in perspective representing a portion of a wheel of this vehicle, as well as the electronic module fitted on the latter, FIG. 2 is a diagrammatic top view of a vehicle on which are diagrammatically represented the "solid-borne" waves resulting from the rotation of the engine, and FIG. 3 is a graph comparing two signals delivered by measurement means respectively located on a front wheel (broken line) and on a rear wheel (thick line).

DETAILED DESCRIPTION OF THE INVENTION

The locating device according to the invention represented by way of example in FIGS. 1a and 1b is intended to locate the longitudinal position (front wheel or rear wheel) of wheels of a vehicle.

This locating device is more specifically intended to be installed on vehicles provided with a monitoring system such as that, represented in FIG. 1a, fitted on a vehicle 1 with engine M provided with four wheels conventionally fitted with a tire: two front wheels 2, 3 and two rear wheels 4, 5.

Such monitoring systems conventionally comprise, firstly, associated with each wheel 2-5, an electronic module 6-9, for example joined to the rim of said wheel so as to be positioned inside the tire cover.

Each of these electronic modules 6-9 incorporates, for example (FIG. 1b), sensors 11 dedicated to measuring parameters, such as pressure and/or temperature of the tire, connected to a computation unit 12 with microprocessor electrically powered by means of a button cell battery 13, and linked to an RF sender connected to a high-frequency antenna 14.

The monitoring system also comprises a centralized computer or central processing unit 10 (FIG. 1) located in the vehicle 1, comprising a microprocessor and incorporating an RF receiver able to receive the signals sent by each of the four electronic modules 6-9.

Usually, such a monitoring system, and in particular its central processing unit 10, are designed so as to inform the driver of any abnormal variation of the parameters measured by the sensors 11 associated with the wheels 2-5.

Associated with this monitoring system, and an integral part of the latter, the function of the locating device according to the invention is to make it possible to associate with each signal received by the central processing unit 10, an indication concerning the longitudinal position of the wheel 2-5 fitted with the electronic module 6-9 originating this signal.

To this end, this locating device comprises measurement means 15 (FIG. 1b), such as a vibration sensor or an acoustic sensor, incorporated in each electronic module 6-9 and adapted to supply a signal representative of the variations of the amplitude according to the frequency, of the vibrations to which said measurement means are subjected to when the engine M is running.

As an example, the sensors used can consist of vibration sensors 15 designed to measure the "solid-borne" waves, that is, as represented in FIG. 2, the vibrations that are propagated by solid pathway, transmitted, from their source (engine M), through the solid channel (carbody), to their destination (wheels 2-5).

Such measurement means or sensors 15 positioned in accordance with the invention present the following particular features, which are decisive according to the principle of the invention:

the signals representative of the amplitude spectra delivered by sensors 15 positioned on one and the same end, front or rear, present substantially no differential offset between them, the signals representative of the amplitude spectra delivered by sensors 15 positioned on different ends present a characteristic differential offset able to make it possible to determine the longitudinal location of the wheels.

As an illustration, FIG. 3 represents two signals delivered by two sensors respectively located on a front wheel 2, 3 (solid line) and on a rear wheel 4, 5 (broken line), and highlights the characteristic frequency offset $\Delta f$ that exists between these two signals, in the example, substantially equal to 3 Hertz.

These particular features make it possible to implement a locating method that consists, according to the invention, for each standard vehicle 1:

in a preliminary characterization phase, in performing, with the engine M running and for at least one speed of rotation of said engine, a spectral analysis of the signals representative of the vibrations according to the frequency, delivered by the respective sensors 15 of a wheel 2, 3 mounted on the front end and of a wheel 4, 5 mounted on the rear end, so as to define the frequency offset between said signals, and in setting up a procedure for locating the longitudinal position of the wheels 2-5 consisting in carrying out an analysis of the signals representative of the variations of amplitude of the vibrations according to the frequency when the engine is running (whether the vehicle is stationary or moving), delivered, at at least one same instant t, by the different sensors 15, and in deducing from the frequency offset between said signals, an indication concerning the longitudinal position of each wheel 2-5.

The locating method according to the invention described hereinabove therefore makes it possible, by installing measurement means such as vibration sensors or acoustic sensors in each electronic module mounted on a vehicle wheel, to very rapidly and reliably locate the longitudinal position of said wheel.

The invention claimed is:

1. A method for locating a longitudinal position, either on a front end or on a rear end of a vehicle (1) with a motor (M), of wheels (2-5) fitted with at least one electronic module (6-9) adapted to send, to a central processing unit (10) mounted on the vehicle (1), signals representative of operating parameters of each wheel also comprising an identification code of each wheel, said locating method comprising:

incorporating in each electronic module (6-9), means for measuring (15) vibrations stressing the corresponding wheel and resulting from rotation of the motor (M);

in a preliminary phase of characterization of each vehicle type, in performing, with the motor (M) running and for at least one speed of rotation of said motor (M), a spectral analysis of the signals representative of the vibrations according to a frequency delivered by the respective means for measuring (15) of a wheel (2, 3) mounted on the front end and of a wheel (4, 5) mounted on the rear end, so as to establish a criterion for differentiating said signals comprising a frequency offset; and setting up a procedure for locating a longitudinal position of the wheels (2-5) comprising carrying out, with the motor running, an analysis of the signals representative of amplitude variations of the vibrations according to the frequency, delivered, at at least one same instant t, by a different means for measuring (15), and deducing from the frequency offset between said signals, an indication concerning the longitudinal position of each wheel (2-5).

2. The locating method as claimed in claim 1, wherein the means for measuring comprise vibration sensors (15) able to deliver signals representative of the vibrations stressing the wheels (2-5).

3. The locating method as claimed in claim 2, wherein the signals representative of the vibrations stressing the wheels (2-5) are solid borne vibrations propagated along a solid path from the motor.

4. The locating method as claimed in claim 3, wherein the solid borne vibrations are propagated through a carbody to the wheels (2-5).

5. The locating method as claimed in claim 1, wherein each electronic module (6-9) is joined to a rim of the corresponding wheel so as to be positioned inside a tire cover.

6. The locating method as claimed in claim 1, wherein the electronic module (6-9) includes at least one of pressure or temperature sensors.

7. The locating method as claimed in claim 1, wherein the pressure or temperature sensors are connected to a computation unit (12) that includes a microprocessor.

8. The locating method as claimed in claim 7, wherein there are four electronic modules (6-9).

9. The locating method as claimed in claim 7, wherein the microprocessor is electronically powered by a button cell battery and is linked to an RF sender connected to a high-frequency antenna.

10. The locating method as claimed in claim 1, wherein the central processing unit includes a microprocessor and incorporates an RF receiver able to receive the signals sent by the electronic modules (6-9).

11. The locating method as claimed in claim 1, wherein the means for measuring (15) is a vibration sensor or an acoustic sensor adapted to supply a signal representative of a frequency amplitude of the vibrations to which the means for measuring (15) is subjected to when the motor (M) is running.

12. A method for locating the longitudinal position, either on a front end or on a rear end of a vehicle (1) with a motor (M), of wheels (2-5) fitted with at least one electronic module (6-9) adapted to send, to a central processing unit (10) mounted on the vehicle (1), signals representative of operating parameters of each wheel also comprising an identification code of each wheel, said locating method comprising:

incorporating in each electronic module (6-9), a vibration sensor or an acoustic sensor configured for measuring vibrations stressing the corresponding wheel and resulting from rotation of the motor (M);

in a preliminary phase of characterization of each vehicle type, in performing, with the motor (M) running and for at least one speed of rotation of said motor, a spectral analysis of the signals representative of the vibrations according to a frequency delivered by the respective vibration sensor or acoustic sensor of a wheel (2, 3) mounted on the front end and of a wheel (4, 5) mounted on the rear end, so as to establish a criterion for differentiating said signals comprising a frequency offset; and setting up a procedure for locating a longitudinal position of the wheels (2-5) comprising carrying out, with the motor running, an analysis of the signals representative of amplitude variations of the vibrations according to the frequency, delivered, at least one same instant t, by a different vibration sensor or acoustic sensor, and deducing from the frequency offset between said signals, an indication concerning the longitudinal position of each wheel (2-5).

13. The locating method as claimed in claim 12, wherein the signals representative of the vibrations stressing the wheels (2-5) are solid borne vibrations propagated along a solid path from the motor.

14. The locating method as claimed in claim 13, wherein the solid borne vibrations are propagated through a carbody to the wheels (2-5).

15. The locating method as claimed in claim 12, wherein each electronic module (6-9) is joined to a rim of the corresponding wheel so as to be positioned inside a tire cover.

16. The locating method as claimed in claim 12, wherein the electronic module (6-9) includes at least one of pressure or temperature sensors.

17. The locating method as claimed in claim 12, wherein the pressure or temperature sensors are connected to a computation unit (12) that includes a microprocessor.

18. The locating method as claimed in claim 17, wherein the microprocessor is electronically powered by a button cell battery and is linked to an RF sender connected to a high-frequency antenna.

19. The locating method as claimed in claim 12, wherein the central processing unit includes a microprocessor and incorporates an RF receiver able to receive the signals sent by the electronic modules (6-9).

20. The locating method as claimed in claim 12, wherein there are four electronic modules (6-9).

* * * * *